United States Patent [19]

Derrien

[11] Patent Number: 5,279,480

[45] Date of Patent: Jan. 18, 1994

[54] SHOCK ABSORBER FOR USE IN LOWERING AIRCRAFT LANDING GEAR

[75] Inventor: Michel Derrien, Versailles, France

[73] Assignee: Messier-Bugatti, Velizy Villacoublay, France

[21] Appl. No.: 19,848

[22] Filed: Feb. 19, 1993

[30] Foreign Application Priority Data

Feb. 21, 1992 [FR] France .................. 92 02016

[51] Int. Cl.⁵ .......................... B64C 25/58; F16F 9/46; F16F 9/18
[52] U.S. Cl. ............................... 244/104 FP; 188/318; 188/319; 188/299
[58] Field of Search ............... 244/104, 104; 188/314, 188/315, 317, 318, 319, 299; 267/64.13, 113, 218

[56] References Cited

U.S. PATENT DOCUMENTS

| | | | |
|---|---|---|---|
| 2,649,938 | 8/1953 | Crabtree | 188/317 |
| 2,774,446 | 12/1956 | DeCarbon | 188/314 |
| 2,892,626 | 6/1959 | Scott et al. | 244/102 R |
| 3,074,708 | 1/1963 | Lush et al. | 267/64.13 |
| 3,176,801 | 4/1965 | Huff | 188/299 |
| 4,106,596 | 8/1978 | Hausmann | 188/314 |
| 4,291,850 | 9/1981 | Sharples | 244/104 FP |
| 4,503,951 | 3/1985 | Imaizumi | 188/317 |
| 4,506,869 | 3/1985 | Masclet et al. | 188/299 |
| 4,530,425 | 7/1985 | Veaux et al. | 188/319 |
| 4,960,188 | 10/1990 | Wössner | 188/299 |
| 4,969,643 | 11/1990 | Kroecker et al. | 188/318 |
| 5,161,653 | 11/1992 | Hare, Sr. | 188/318 |

FOREIGN PATENT DOCUMENTS

| | | |
|---|---|---|
| 0014660 | 6/1980 | European Pat. Off. |
| 0461981 | 10/1991 | European Pat. Off. |
| 1387972 | 6/1965 | France .................. 188/318 |
| 3-099922 | 4/1991 | Japan .................. 267/218 |

Primary Examiner—Galen L. Barefoot
Assistant Examiner—Virna Lissi Ansley
Attorney, Agent, or Firm—Sixbey, Friedman, Leedom & Ferguson

[57] ABSTRACT

The invention relates to a shock absorber comprising a main body and a rod-piston, with the rod-piston being retracted when the landing gear is down and extended when the landing gear is up. The main body comprises, in succession, three chambers that are separated by associated partitions, and that comprise: a first hydraulic chamber in which the rod-piston slides freely; a chamber in which a separator piston slides, delimiting a second hydraulic chamber; and a chamber in which another piston slides, delimiting both a third hydraulic chamber and a chamber containing gas under high pressure. Communication means are provided between said chambers together with two associated electrically controlled valves enabling corresponding fluid connections to be selectively established. Thus, in a normal regime, the shock absorber enables a certain amount of energy to be stored while the landing gear is being lowered, which energy is restored next time the landing gear is raised; while during an emergency regime, the shock absorber participates in braking the landing gear while it is being lowered in an emergency, e.g. under its own weight after a jammed lowering actuator has been declutched.

8 Claims, 1 Drawing Sheet

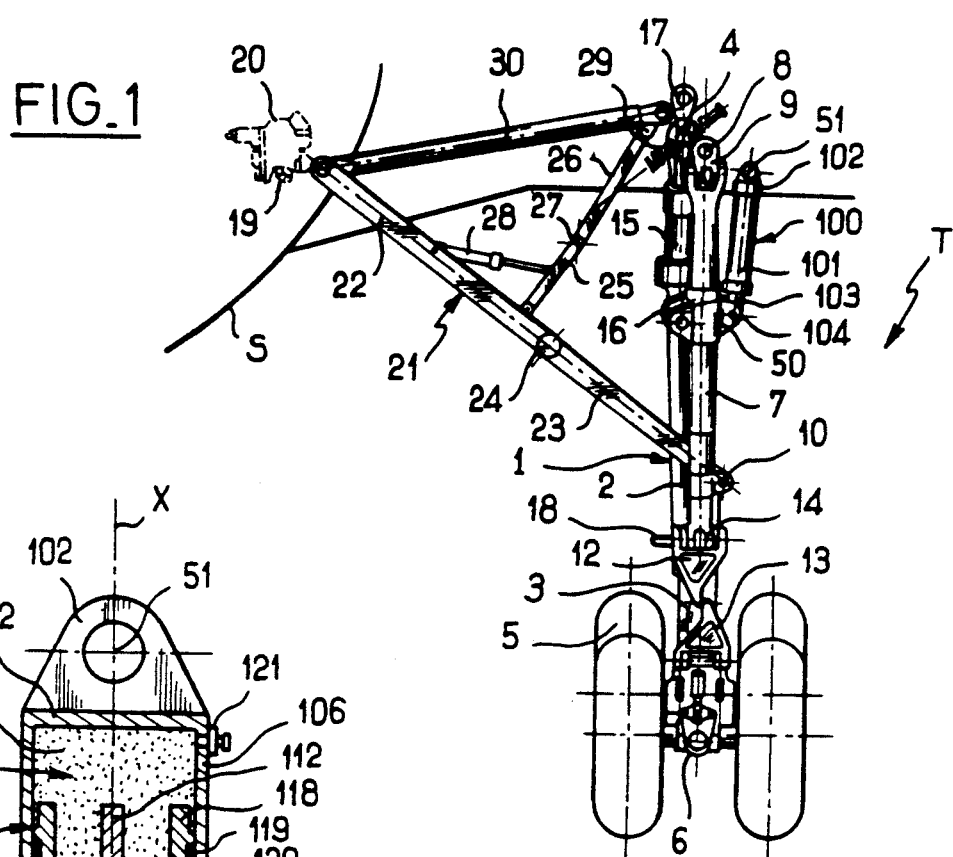
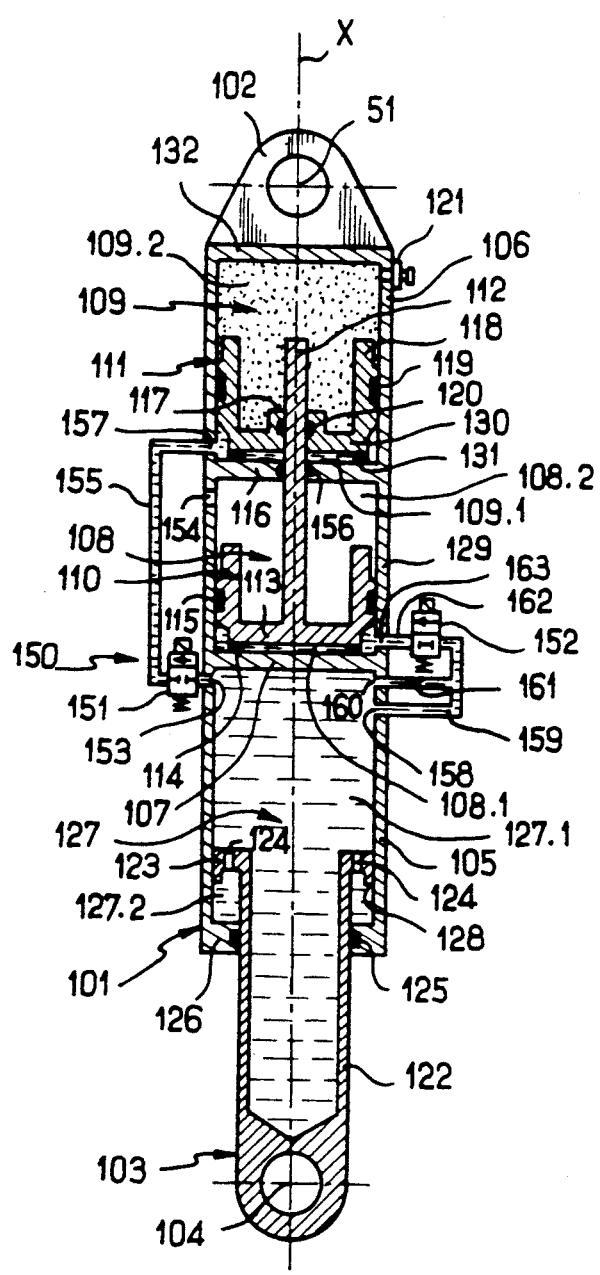

SHOCK ABSORBER FOR USE IN LOWERING AIRCRAFT LANDING GEAR

The invention relates to shock absorbers for use in lowering aircraft landing gear, and more particularly to a "lowering" shock absorber for raisable landing gear, the shock absorber being of the type comprising a main body or "cylinder" and a rod-piston, and being disposed between a point of the landing gear and a fixed point of the structure of an airplane in such a manner that the rod-piston is retracted when the landing gear is down and is extended when the landing gear is up.

BACKGROUND OF THE INVENTION

Such shock absorbers are therefore designed to act during lowering of the landing gear when the linear actuator associated with the leg of the landing gear is engaged.

So long as the landing gear lowering operation takes place normally under drive from the associated linear actuator, and in particular from an electromechanical actuator, the actuator itself provides natural braking for the lowering of the landing gear.

In contrast, in the event of a mechanical breakdown in the auxiliary power generation system of the aircraft (which breakdown may be local or more generalized), the actuator is declutched and therefore no longer provides the resistance that is available in normal operation. Under such circumstances, it should nevertheless be possible to perform emergency lowering of the landing gear without damaging its components, i.e. it then appears necessary to be able to bring into play means capable of providing the now-lacking braking, particularly at the end of the down stroke of the landing gear.

OBJECTS AND SUMMARY OF THE INVENTION

A particular object of the invention is to resolve this problem, by designing a shock absorber whose structure makes immediate and effective action possible in the event of the landing gear being lowered under emergency conditions.

An object to the invention is thus to provide a shock absorber capable of having two possible operating regimes: a normal regime; and an emergency regime in which said shock absorber acts as a brake during lowering, with this taking place completely safely, even in the event of a breakdown in the airplane's auxiliary power generation system.

Another object of the invention is to provide a shock absorber whose behavior is favorable during normal operation of the linear actuator that drives the landing gear.

Finally, another object of the invention is to design a shock absorber that is simple in structure, and whose control members are easily accessible to facilitate maintenance operations.

More particularly, the present invention provides a shock absorber for use in lowering aircraft landing gear, the shock absorber comprising a main body and a rod-piston, said shock absorber being disposed between a point on the landing gear and a fixed point of the airplane structure in such a manner that the rod-piston is retracted when the landing gear is down and extended when the landing gear is up, wherein the main body comprises, in succession, three chambers separated by associated intermediate partitions of said body, providing a first hydraulic fluid chamber in which the rod-piston slides freely, a chamber adjacent to said first chamber in which a first separator piston slides, delimiting a second hydraulic fluid chamber and a chamber that is connected to the atmosphere, and a last chamber in which a second separator piston slides, delimiting a third hydraulic fluid chamber and a chamber of gas under high pressure, said first separator piston having an axial rod which penetrates into said gas chamber by passing through said second separator piston, and wherein said shock absorber further includes communication means between the first hydraulic fluid chamber and each of the second and third hydraulic fluid chambers, with two associated electrically controlled valves enabling a fluid connection to be selectively established with one or other of said second and third chambers so as to obtain two operating regimes for the shock absorber, including a normal regime in which the second separator piston acts on its own and enables a certain amount of energy to be stored on lowering of the landing gear, which energy can be reused during subsequent raising of said landing gear, and an emergency regime in which the first separator piston acts on its own and participates in braking the emergency lowering of the landing gear.

Preferably, in the rest position, the first and second separator pistons bear, via spacer projections, against the corresponding intermediate partitions of the main body.

Also advantageously, the communication means include a duct connecting an end orifice of the first hydraulic fluid chamber to an end orifice of the third hydraulic fluid chamber, said orifices opening out in the vicinity of the intermediate partitions of the main body, and an associated first electrically controlled valve which is opened during the normal operating regime of said shock absorber, the other electrically controlled valve then being closed.

It is also advantageous for the communication means to include a duct connecting at least one end orifice of the first hydraulic fluid chamber to an end orifice of the second hydraulic fluid chamber, said orifices opening out in the vicinity of the corresponding intermediate partition of the main body, and a second electrically controlled valve which is open during the emergency regime of said shock absorber, the other electrically controlled valve then being closed.

It is then advantageous for the above-specified duct to be associated with two spaced-apart orifices of the first hydraulic fluid chamber, with that one of said orifices which is closer to the intermediate partition to being associated with an end-of-stroke shock absorbing diaphragm for final braking of emergency lowering of the landing gear.

Also preferably, the communication means are disposed outside the main body. This facilitates accessibility for maintenance operations performed on the ground.

Also advantageously, the rod-piston is hollow, and its axial guidance is provided by a sliding collar associated with the piston portion of said rod-piston, said piston portion having axial bores that allow the hydraulic fluid to pass freely from one side to the other of the piston portion.

It is also advantageous for the shock absorber to be hinged via its rod-piston to the landing gear, and via its main body to the fixed point on the airplane structure.

BRIEF DESCRIPTION OF THE DRAWING

Other characteristics and advantages of the invention appear more clearly in the light of the following description and of the accompanying drawing relating to a particular embodiment, and given with reference to the figures, in which:

FIG. 1 shows a particular landing gear in its lowered position and fitted with a shock absorber of the invention, i.e. having its rod-piston retracted; and FIG. 2 is an axial section through said shock absorber in its rod-extended position, i.e. in the position it occupies when the landing gear is in the raised position.

MORE DETAILED DESCRIPTION

FIG. 1 shows a particular landing gear T in the landing gear down position, and fitted with a shock absorber 100 of the invention. The landing gear shown merely constitutes one possible example, and it will be understood that the shock absorber of the invention could be fitted to other types of raisable landing gear. The configuration shown in FIG. 1 nevertheless makes it easier to understand the environment in which the shock absorber of the invention is used, and in particular its disposition relative to the landing gear and to the structure of the airplane.

The raisable type landing gear T includes a main shock absorber 1 which is constituted by a shock absorber strut 2 and a rod 3 that slides coaxially inside said strut. The top of the strut 2 is hinged (at 4) to the structure S of the airplane, the hinge axis passing through the end of a link branch 8 secured to said strut. A brace element 7 is associated with the main shock absorber 1, being connected firstly via a rotary hinge 9 to the end of the above-mentioned link branch 8, and secondly being hinged at 14 to a bottom appendix of the shock absorber strut 2. A scissors linkage comprising two arms 12 and 13 is hinged at 14 to the shock absorber strut 2 and also to the bottom portion of the sliding rod 3. A linear actuator 15 serves to raise or lower the landing gear T, the body of said actuator being hinged to a middle appendix 16 of the brace element 7, while the rod of said actuator has its end 17 hinged to the structure of the airplane. There can also be seen a wheel 18 fitted at the end of an appendix provided at the bottom portion of the strut 2, said wheel co-operating, when the landing gear is raised, with the hook 19 of a catch box 20 received in the structure of the airplane.

The landing gear T of FIG. 1 is also fitted with a hinged side brace 21 having two alignments, a main alignment connecting the shock absorber strut 2 (level with the above-mentioned hinge 10) to the airplane structure S (level with a hinge that is also associated with a connecting rod 30), and the main alignment comprises an upper arm 22 and a lower arm 23 which are hinged together at a hinge 24. The secondary alignment of said hinged side brace 21 connects the arm 22 of the main alignment to the airplane structure, and is constituted by a lower arm 25 and an upper arm 26 which are hinged together at a hinge 27. A traction spring 29 can also be seen associated with the upper arm 26 of the secondary alignment, said spring participating in the deployment of said alignment. Finally, there can be seen a small actuator 28 which is associated with unlocking the hinged side brace, which actuator is organized to break the secondary alignment and consequently to break the main alignment when the landing gear is raised.

The landing gear T as described above includes a shock absorber 100 of the invention which comprises a main body 101 and a rod-piston 103 that slides in said main body. In the present example, the shock absorber 100 is hinged at 104 to an appendix 50 of the brace element 7 and via its main body 101, or more precisely via end gusset plates 102 thereof to a fixed point 51 of the airplane structure S. Other dispositions may naturally be considered, providing the shock absorber is disposed between a point of the landing gear and a fixed point of the airplane structure in such a manner that the rod-piston 103 is retracted when the landing gear is down, and extended when the landing gear is up.

The structure of the shock absorber 100 of the invention is now described in greater detail with reference to the axial section of FIG. 2.

The shock absorber 100 thus includes a main body 101 in which a rod-piston 103 slides freely, passing through the bottom 126 of the main body 101, said rod-piston being hollow in this case and having a rod portion 122 and a piston portion 123. Sealing where it passes through the bottom 126 of the main body is provided by a sealing ring 125, and the peripheral portion 128 of the piston 123 has a collar that slides and provides axial guidance for the rod-piston 103 along the axis X of the main body 101. The piston portion 123 also has at least one axial bore 124 (two can be seen in the figure) providing free passage for hydraulic fluid from one side thereof to the other, without said fluid being throttled during movement of the rod-piston 103.

In the description below, reference is made, for the sake of convenience, to members that are "upper" or "lower" as shown in the vertical orientation of FIG. 2, however it will naturally be understood that the above-specified terms should not be taken literally when the shock absorber is in any other orientation.

The main body 101 is constituted by a lower portion 105 and by a middle portion 129 which are separated from each other by a solid intermediate partition 107, followed by an upper portion 106 which is separated from the middle portion 129 by another intermediate partition 116 which has a central bore for passing a piston-rod 112, with said passage being sealed by a sealing ring 156.

The main body 101 thus comprises, in succession, three chambers 127, 108, and 109 that are mutually separated by the above-mentioned intermediate partitions 107 and 116.

Firstly there is a first chamber 127 in which the rod-piston 103 slides freely. This first chamber is filled with hydraulic fluid, on both sides of the piston portion 123. The axial bores 124 guarantee equal pressures on either side of the piston portion 123, i.e. both for the full section upper portion 127.1 and for the annular section lower portion 127.2.

Thereafter there is a second chamber 108 delimited by the two intermediate partitions 107 and 116, in which chamber a first separator piston 110 slides, which separator piston delimits a second hydraulic fluid chamber 108.1 and a chamber 108.2 that is open to the outside via an orifice 154 provided for this purpose through the wall of the intermediate portion 129 of the main body 101. Because the chamber 108.2 is open to the outside via the associated orifice 154, it is advantageous to provide chromium plating in said chamber in order to avoid corrosion. The first piston 110 has a bottom 113 from which there extend the central rod 112, and the lateral portion of the piston, both from one side, and spacing projections 114 from the opposite side. In the rest position, this first piston 111 bears against the wall 107 via its spacing projections 114, with the same partition also serving to limit the stroke of the rod-piston 103 in the retraction direction thereof. The sliding of the first piston 110 in the main body is sealed by means of an associated piston ring 115.

Finally, there is a last chamber 109 delimited by the intermediate chamber 116 and by the top end 132 of the main body 101, with said chamber having a second separator piston 111 sliding therein delimiting a third hydraulic fluid chamber 109.1 and a chamber 109.2 filled with gas under high pressure, e.g. nitrogen.

As mentioned above, the separator piston 110 has an axial rod 112, and said axial rod passes through the intermediate partition 116 via an associated sealing ring 156, after which it penetrates into the chamber 109, passing through the second separator piston 111. The second separator piston 111 has a bottom 130 with a central portion 117 that passes the rod 112 of the first piston 110 in sealed manner by virtue of an associated sealing ring 120. Like the first piston 110, this second piston 111 includes spacing projections 131 that extend from the opposite side of the bottom 130 to a side wall 118 of said piston.

It should be observed that the bottom of each of the two pistons 110 and 111 includes a peripheral restriction that serves to define an enlargement in the volume often associated hydraulic chamber when the corresponding piston is in its bottom abutment position, thereby facilitating the hydraulic connection with the first chamber 127 via associated orifices. The side wall 118 of the second piston 111 also includes a piston ring 119 that provides sealing for the chamber 109.2 that is filled with air or nitrogen under high pressure, which chamber is inflated by means of an associated valve 121 of conventional type.

It is of interest to observe that the above-mentioned seals 115, 120, and 156 are wetted by hydraulic fluid, and that this is advantageous for the length of life of said seals.

The chambers 127, 108.1 and 109.1 which are filled with hydraulic fluid are referred to below as "hydraulic chambers", while the chamber 109.2 which is filled with gas under high pressure is referred to below as a "gas chamber".

The shock absorber also includes means 150 providing communication between the first hydraulic chamber 127 and each of the second and third hydraulic chambers 108.1 and 109.1. These communication means comprise firstly for the link between the hydraulic chambers 127 and 109.1, a duct 155 connecting an end orifice 153 of the first hydraulic chamber 127 to an end orifice 157 of the third hydraulic chamber 109.1. The orifices 153 and 157 are called "end orifices" insofar as they open out into the vicinity of the associated intermediate partitions 107 and 116, thereby enabling them to be operative when the rod-piston 103 is in its high extreme position and when the second separator piston 111 is in its low position. For the hydraulic connection between the first hydraulic chamber 127 and the second hydraulic chamber 108.1, the communication means comprise a duct 162 connecting at least one end orifice of the first hydraulic chamber 127 to an end orifice 163 of the second hydraulic chamber 108.1. By providing at least one end orifice, and in the present example two stepped orifices 158 and 160, it is possible to organize end-of-stroke damping, in a manner explained below. As before, the orifices 158, 160, and 163 are called "end orifices" since they open out in the vicinity of the corresponding intermediate partition 107 of the main body 101.

In accordance with an essential aspect of the invention, the communication means 150 include two associated electrically controlled valves 151 and 152 enabling a fluid connection to be selectively established with one or other of the second and third hydraulic chambers 108.1 and 109.1.. These electrically controlled valves make it possible to obtain two operating regimes for the shock absorber, comprising a normal regime in which the second separator piston 111 acts on its own and enables a certain amount of energy to be absorbed, which energy can be reused when the said landing gear is subsequently raised, and an emergency regime in which the first separator piston 110 acts on its own and contributes to braking the emergency lowering of the landing gear.

The first electrically controlled valve 151 is disposed on the duct 155 and it is preferably in the open position when at rest. As for the second electrically controlled valve 152, it is closed when at rest: when open, it provides a connection between the full section portion 127.1 of the first hydraulic chamber 127 and the second hydraulic chamber 108.1. In the present example, the orifice 158 provided in the lower portion of the main body 101 leads via a small duct 159 to said second electrically controlled valve 152 downstream from which the duct 162 leads to the above-mentioned orifice 163 through the middle portion 106 of the main body 101. The other orifice 160 which is closer to the intermediate partition 107 is associated, in this case, with an end-of-stroke damping diaphragm 161 for braking the emergency lowering of the landing gear in a manner described in greater detail below when explaining the operation of the shock absorber of the invention. It should be observed that the orifice 158 is close enough to the partition 107 to establish a passage as quickly as possible when the rod of the piston is being retracted, while the orifice 160 is effective only at the end of the retraction stroke of said rod-piston, once the piston portion 123 thereof masks the above-mentioned orifice 158.

The operation of the shock absorber 100 whose main structural members have been described above is now described in detail, with reference initially to its normal operating regime.

Starting from the landing gear raised position, the shock absorber 100 is in the position shown in FIG. 2, with its rod-piston 103 close to its position of maximum extension. When the pilot commands the linear actuator associated with the landing gear leg to cause the landing gear to be lowered, the electrically controlled valve 151 is open while the electrically controlled valve 152 is closed. Under such circumstances, the retraction of the rod-piston 103 expels hydraulic liquid from the full section portion 127.1 of the first chamber 127 via the orifice 153 towards the third hydraulic chamber 109.1. Since the electrically controlled valve 152 is closed, the second hydraulic chamber 108.1 does not receive any quantity of fluid. As a result, the first separator piston 110 is not subjected to any force tending to urge it upwards, and it remains in its low abutment position because of the pressure from the high pressure gas to which it is subjected via the end of its axial rod 112. The same does not apply to the second separator piston 111 which travels along a certain stroke away from its support abutments 131, thereby compressing the gas in the gas chamber 109.2.

When the linear actuator is subsequently commanded to raise the landing gear, with the side brace having two alignments being folded up for landing gear of the kind shown in FIG. 1, the piston rod 103 moves back out from the main body 101. When the landing gear is raised normally, the electrically controlled valves 151 and 152 remain in the same positions as during the above-described normal lowering. Extending the rod-piston 103 causes hydraulic fluid to move out from the third hydraulic chamber 109.1 and penetrate into the full section portion 127.1, with said fluid motion being aided by the action of the second separator piston 111 which is subjected to the pressure of the gas enclosed in the gas chamber 109.2, and this continues until said second piston has moved back down into abutment against its supports 131. As a result, the energy stored by compressing the gas contained in the gas chamber 109.2 while the landing gear is being lowered is subsequently restored when the landing gear is next raised. A first operating regime is thus obtained for the shock absorber 100, with a normal regime in which the second piston 111 acts on its own and enables a certain amount of energy to be stored while the landing gear is being lowered, which energy is used while the landing gear is subsequently being raised again. In the context of such normal operation, the second electrically controlled valve 152 thus remains closed, and the first separator piston 110 has no effect, remaining in abutment in its low position via its support 114 against the intermediate partition 107.

In the event of a mechanical breakdown that is localized or even in the event of a generalized breakdown of the airplane's auxiliary power generation, the linear actuator is declutched, and thus no longer provides the resistance to motion that it provides in normal operation. It is in this emergency situation that the shock absorber of the invention acts to contribute to the missing braking, particularly at the end of the down stroke of the landing gear.

In such a breakdown situation, a simple electrical contact operated by the pilot reverses the positions of the electrically controlled valves 151 and 152 such that the electrically controlled valve 151 takes up the closed position while the electrically controlled valve 152 takes up the open position.

Starting as before from a position where the landing gear is raised, i.e. a position of the shock absorber corresponding to that shown in FIG. 2, retraction of the rod-piston 103 causes a volume of hydraulic fluid to be expelled from the full section portion 127.1 of the first hydraulic chamber 127 into the second hydraulic chamber 108.1, while no fluid is fed to the third hydraulic chamber 109.1. The second separator piston 111 thus remains in its low abutment position while the first separator position 110 is raised easily since the only resistance opposing its upwards stroke results from the pressure exerted by the gas on the end of its central rod 112. The rod-piston 103 is thus retracted with controlled motion, this corresponding to braking being performed during emergency lowering of the landing gear. When the piston portion 123 masks the orifice 158, the expelled hydraulic fluid passes only through the orifice 160, and consequently through the diaphragm 161, thereby achieving end-of-stroke damping that is entirely favorable for the end of emergency landing gear lowering. At the end of emergency lowering, the second piston 111 remains in its low abutment position while the first piston 110 has moved up through a certain distance, which distance is limited by abutment either between the side wall of the piston against the partition 116, or else between the axial rod of said piston and the top end 132.

A second operating regime is thus obtained for the shock absorber 100, corresponding to an emergency regime in which the first piston 110 is used on its own and participates in braking the emergency lowering of the landing gear.

If it is desired to raise the landing gear after such emergency lowering, safety means for use under fault conditions are then used to take over the function normally provided by the linear actuator, and the shock absorber provides a small amount of assistance to the means commanded in this way: the two electrically controlled valves 151 and 152 are retained in the positions they occupied during the emergency lowering, and the downwards return motion of the first piston 110 under the effect of the pressure of the gas acting on the section of its central rod 112 tends to expel hydraulic fluid via the second electrically controlled valve 152 which has remained open, firstly via the diaphragm 161, and subsequently via the normal duct 159 once the orifice 158 has been uncovered. In this situation, the first electrically controlled valve 151 remains closed, as during emergency lowering of the landing gear.

A shock absorber is thus provided which is capable of having two possible operating regimes: including an emergency regime in which said shock absorber participates in braking the lowering, and this is achieved entirely safely even in the event of the airplane's auxiliary power generation breaking down; and a normal operation regime in which the behavior of the shock absorber is favorable for operation of the linear actuator associated with the landing gear. Furthermore, as shown in FIG. 2, the communication means 150 are organized outside the main body 101 so that the control members (valves 151 and 152) are easily accessible to facilitate any possible ground maintenance operations.

In addition, the structure of the shock absorber is simple, and it enables a work saving of about 10% to be achieved, thus making it possible to use a smaller electric motor in the linear actuator of the landing gear, thus reducing current consumption.

The invention is not limited to the embodiment described above, but on the contrary it extends to any variant that uses equivalent means to reproduce the essential means specified above.

I claim:

1. A shock absorber for use in lowering aircraft landing gear, the shock absorber comprising a main body and a rod-piston, said shock absorber being disposed between a point on the landing gear and a fixed point of the airplane structure in such a manner that the rod-piston is retracted when the landing gear is down and extended when the landing gear is in up, wherein the main body comprises, in succession, three chambers separated by associated intermediate partitions of said body, providing a first hydraulic fluid chamber in which the rod-piston slides freely, a chamber adjacent to said first chamber in which a first separator piston slides, delimiting a second hydraulic fluid chamber and a chamber that is connected to the atmosphere, and a last chamber in which a second separator piston slides, delimiting a third hydraulic fluid chamber and a chamber of gas under high pressure, said first separator piston having an axial rod which penetrates into said gas chamber by passing through said second separator piston, and wherein said shock absorber further includes communication means between the first hydraulic fluid chamber and each of the second and third hydraulic fluid chambers, with two associated electrically controlled valves enabling a fluid connection to be selectively established with one or other of said second and third chambers so as to obtain two operating regimes for the shock absorber, including a normal regime in which the second separator piston acts on its own and enables a certain amount of energy to be stored on lowering of the landing gear, which energy can be reused during subsequent raising of said landing gear, and an emergency regime in which the first separator piston acts on its own and participates in braking the emergency lowering of the landing gear.

2. A shock absorber according to claim 1, wherein, in the rest position, the first and second separator pistons bear, via spacer projections, against the corresponding intermediate partitions of the main body.

3. A shock absorber according to claim 1, wherein the communication means include a duct connecting an end orifice of the first hydraulic fluid chamber to an end orifice of the third hydraulic fluid chamber, said orifices opening out in the vicinity of the intermediate partitions of the main body, and an associated first electrically controlled valve which is opened during the normal operating regime of said shock absorber, the other electrically controlled valve then being closed.

4. A shock absorber according to claim 1, wherein the communication means further include a duct connecting at least one end orifice of the first hydraulic fluid chamber to an end orifice of the second hydraulic fluid chamber, said orifices opening out in the vicinity of the corresponding intermediate partition of the main body, and a second electrically controlled valve which is open during the emergency regime of said shock absorber, the other electrically controlled valve then being closed.

5. A shock absorber according to claim 4 wherein the duct is associated with two spaced-apart orifices of the first hydraulic fluid chamber, with that one of said orifices which is closer to the intermediate partition being associated with an end-of-stroke shock absorbing diaphragm for final braking of emergency lowering of the landing gear.

6. A shock absorber according to claim 1, wherein the communication means are disposed outside the main body.

7. A shock absorber according to claim 1, wherein the rod-piston is hollow, and its axial guidance is provided by a sliding collar associated with the piston portion of said rod-piston, said piston portion having axial bores that allow the hydraulic fluid to pass freely from one side to the other of the piston portion.

8. A shock absorber according to claim 1, wherein the shock absorber is hinged via its rod-piston to the landing gear, and via its main body to the fixed point on the airplane structure.

* * * * *